(12) United States Patent
Yamauchi

(10) Patent No.: US 7,443,583 B2
(45) Date of Patent: Oct. 28, 2008

(54) SCREEN AND IMAGE PROJECTOR USING THE SCREEN

(75) Inventor: Naofumi Yamauchi, c/o Seiko Instruments Inc. 8, Nakase 1-chome, Mihama-ku, Chiba-shi, Chiba 261-8507 (JP)

(73) Assignee: Naofumi Yamauchi (JP)

( * ) Notice: Subject to any disclaimer, the term of this patent is extended or adjusted under 35 U.S.C. 154(b) by 230 days.

(21) Appl. No.: 11/099,164

(22) Filed: Apr. 5, 2005

(65) Prior Publication Data
US 2005/0225687 A1   Oct. 13, 2005

(30) Foreign Application Priority Data

| Apr. 9, 2004 | (JP) | ............................. 2004-115124 |
| Apr. 9, 2004 | (JP) | ............................. 2004-115125 |
| Apr. 9, 2004 | (JP) | ............................. 2004-115126 |
| Apr. 12, 2004 | (JP) | ............................. 2004-116899 |
| Apr. 12, 2004 | (JP) | ............................. 2004-116900 |
| Mar. 17, 2005 | (JP) | ............................. 2005-077621 |

(51) Int. Cl.
*G03B 21/56* (2006.01)
*G03B 21/60* (2006.01)

(52) U.S. Cl. ........................ 359/454; 359/449; 359/459

(58) Field of Classification Search ................. 359/443, 359/449, 452–454, 455, 459
See application file for complete search history.

(56) References Cited

U.S. PATENT DOCUMENTS

| 6,295,162 | B1 * | 9/2001 | Miyata ........................ 359/453 |
| 2002/0145797 | A1 * | 10/2002 | Sales .......................... 359/456 |
| 2003/0214710 | A1 * | 11/2003 | Takahashi et al. ........... 359/443 |
| 2005/0046919 | A1 * | 3/2005 | Taguchi et al. .............. 359/237 |
| 2006/0066802 | A1 * | 3/2006 | Kitayama ................... 349/156 |

FOREIGN PATENT DOCUMENTS

JP    2002-169224    *   6/2002

* cited by examiner

*Primary Examiner*—Diane I. Lee
*Assistant Examiner*—Magda Cruz
(74) *Attorney, Agent, or Firm*—Adams & Wilks

(57) ABSTRACT

A projector screen having a simple configuration, which provides a wide field of view angle and can be used for both transmission and reflection projection is achieved. A screen according to the present invention is provided with a directional scattering layer that scatters incoming light within a specific angular range and transmits incoming light outside the specific angular range. Further, an image projection system can be made by combining the screen with an image projector that projects an image onto the screen.

17 Claims, 10 Drawing Sheets

| 1aa | 1ab | 1ac | 1ad | 1ae |
|-----|-----|-----|-----|-----|
| 1ba | 1bb | 1bc | 1bd | 1be |
| 1ca | 1cb | 1cc | 1cd | 1ce |
| 1da | 1db | 1dc | 1dd | 1de |
| 1ea | 1eb | 1ec | 1ed | 1ee |
| 1fa | 1fb | 1fc | 1fd | 1fe |

SCREEN AND IMAGE PROJECTOR USING THE SCREEN

BACKGROUND OF THE INVENTION

1. Field of the Invention

The present invention relates to a screen on which an optical image is projected from a high brightness CRT, a liquid crystal projector, or a projector that uses a micromirror device. The present invention also relates to an image projector system that uses the screen.

2. Description of the Related Art

Image projector systems such as projector devices that display images by projecting optical images utilizing a high brightness CRT, a liquid crystal projector, a projector using a micromirror device, or the like can simply and easily display a high definition image on a large screen. Consequently, image projector systems are widely used as information communication tools among a plurality of users. The light utilization efficiency of an image projector system may be increased by using a structure in which a white color material or a reflective film is used to cover a surface of the screen, and the visibility of the screen with respect to a plurality of viewers may be increased by distributing beads in a surface of the screen, thus diffusing light. Alternatively, as disclosed in JP 2002-169224 A, it is known to perform image display with good efficiency to a plurality of viewers by providing a directionally reflective structure such as a lenticular lens to a screen surface.

Problems as described below exist, however, with conventional techniques. Although a wide field of view can be achieved with a screen made by using diffusion materials such as beads, the screen becomes dark due to low gain. Further, although a bright screen having a high gain can be obtained by using lenticular lenses due to high directionality, the field of view of the screen becomes narrow. Furthermore, screens used in projectors that employ lenticular lenses are manufactured by forming transparent resins such as acrylic resins, and the manufacturing process thus cannot be made low cost. In addition, image quality degradation becomes large for a medium or small size screen on the order of 8 to 20 inches when viewing an image at a short distance from the screen.

SUMMARY OF THE INVENTION

An object of the present invention is to provide a thin, light weight projector screen having good viewing angle characteristics, good brightness characteristics, and good contrast.

Accordingly, a screen of the present invention includes a directional scattering layer that scatters incoming light within a specific angular range, while transmitting incoming light outside the specific angular range. Examples of the directional scattering layer include: a column-shaped lens sheet that functions to guide light in a thickness direction thereof and has a plurality of fine column-shaped structures arranged within the plane of the column-shaped lens sheet, the column-shaped structures each having a central column-shaped region of a refraction index higher than that of an outer peripheral region that surrounds the central column-shaped region; a perforated sheet having holes that pass through the sheet in a thickness direction; and a liquid crystal polymer in which liquid crystal molecules are arranged.

Furthermore, the screen of the present invention may also be configured such that directional diffusion layers having different specific angular ranges are disposed in the manner of a belt or a row. Further, the screen of the present invention may also be configured such that the directional scattering layer is composed of two directional scattering layers having mutually different specific angular ranges.

Further, an image projection system of the present invention includes a screen having a directional scattering layer, and an optical image projector that projects an optical image to the screen.

DETAILED DESCRIPTION OF THE PREFERRED EMBODIMENTS

Figure 1:
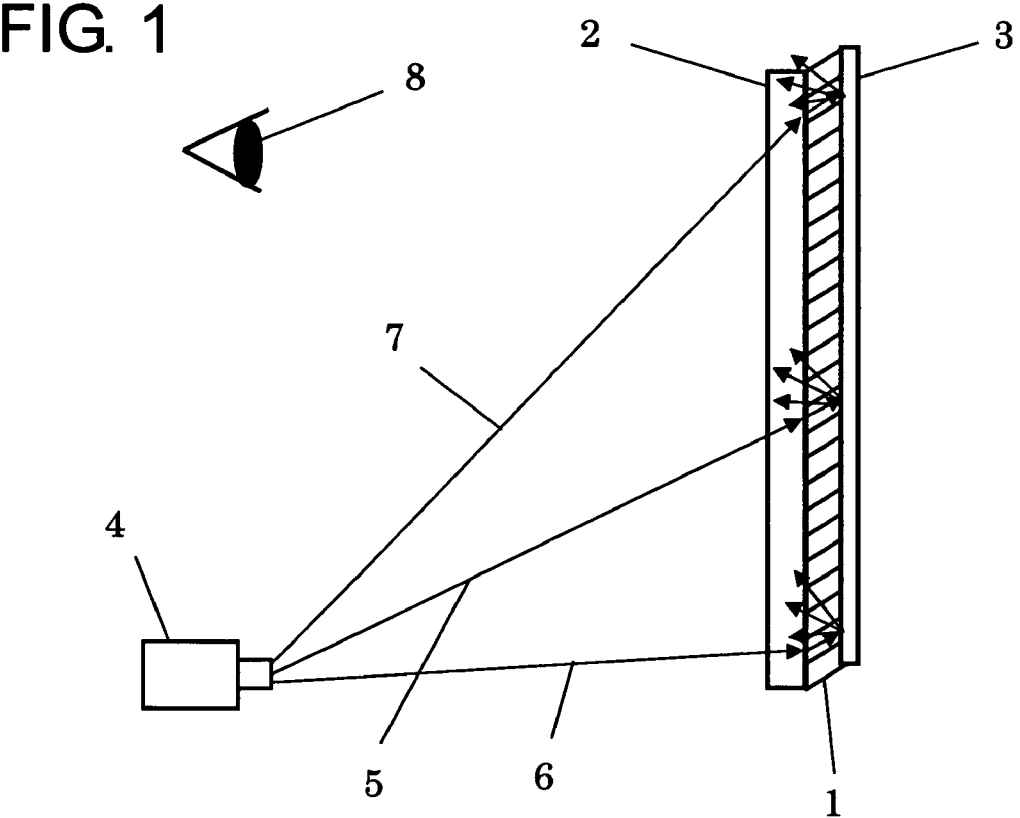
FIG. 1 is a cross sectional view that schematically shows a configuration of a screen according to the present invention.

A screen of the present invention is explained in detail below. A screen of the present invention displays a projected optical image, and is configured by a directional scattering layer that scatters incoming light in a specific angular range, while transmitting incoming light outside the specific angular range. A sheet that functions to guide light in a thickness direction thereof can be used as the directional scattering layer. A plurality of column-shaped lenses, in which regions having a higher index of refraction than peripheral regions are continuously provided in a thickness direction, are arranged within the plane of the sheet. In addition, a perforated resin sheet in which through holes are formed in a resin thickness direction, and a liquid crystal polymer sheet in which liquid crystal molecules are arranged can also be used as the directional scattering layer.

Further, the directional scattering layer may also be configured by a plurality of regions having a different specific angular range. The regions may be set so that optical axis directions of optical images projected to each of the regions, and the center of the specific angular ranges thereof, become symmetric with respect to a perpendicular on the screen. Alternatively, the regions can be set so that the optical axis directions of the optical images projected to each of the regions substantially coincide with the center of the specific angular ranges thereof.

Further, the regions may be set so that center lines of the specific angular ranges in divided regions are in a specific direction, such as a viewing point direction of an observer. Alternatively, the regions may be set so that the specific angular ranges in divided regions become symmetric with a viewing point direction of an observer with respect to a perpendicular on the screen.

The directional scattering layer may also be formed by a first directional scattering layer that scatters incoming light within a first specific angular range and transmits incoming light outside the first specific angular range, and a second directional scattering layer that scatters incoming light within a second specific angular range and transmits incoming light outside the second specific angular range, in which a center axis direction of the first specific angular range differs from a center axis direction of the second specific angular range.

Column-shaped lens sheets that function to guide light in a thickness direction can be used as the directional scattering layers described above. A plurality of column-shaped lenses, in which regions having a higher index of refraction than peripheral regions are continuously provided in a thickness direction, are arranged within the plane of the sheet regions.

Further, an image projector system of the present invention includes a screen having any of the configurations described above, and an optical image projector that projects optical images onto the screen.

Embodiments of the screen of the present invention are explained below with reference to the appended drawings. It should be noted that examples in which a column-shaped lens sheet is used as a directional scattering layer are explained below. The column-shaped lens sheet functions to guide light in a thickness direction thereof. A plurality of column-shaped lenses, in which regions having a higher index of refraction than peripheral regions are continuously provided in a thickness direction, are arranged within the plane of the sheet.

Embodiment 1

FIG. 1 schematically shows a cross sectional configuration of a screen and a projector arrangement according to Embodiment 1. Referring to FIG. 1, an optical image from a projector 4 is projected onto a screen that includes a column-shaped lens sheet 1, a transparent substrate 2, and an optical reflecting layer 3. The projected image is observed through the screen by an observer 8, who is on the same side as the projector 4. Screens used in this manner are called front screens. An optical axis direction of a column-shaped lens is referred to as an orientation direction. With the configuration shown in FIG. 1, orientation directions of column-shaped lenses substantially coincide with an optical axis 5 direction of the optical image projected from the projector 4. In other words, the column-shaped lenses are arranged within the plane of the column-shaped lens sheet so as to be inclined downward. The column-shaped lens sheet is a film having a plurality of column-shaped lenses (column structures) arranged in a planar manner. The column-shaped lenses or column structures used may be graded index column-shaped lenses having an index of refraction that becomes continuously larger toward the center of the lens, step index column-shaped lenses having a two layer structure in which the index of refraction of a center portion is higher than the index of refraction of an outer periphery region around the center portion, and the like. In each case, the column structures have a center region (portion) and a peripheral region (portion) around the center region (portion).

Figure 5:
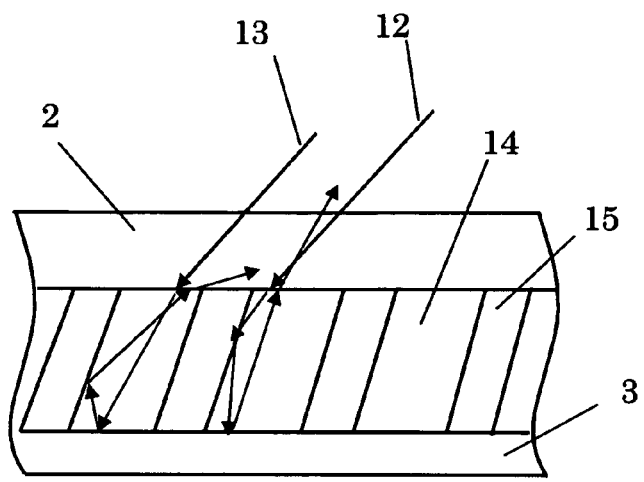
FIG. 5 is an explanatory diagram that shows an example of an optical path within a screen of the present invention.
Figure 6:
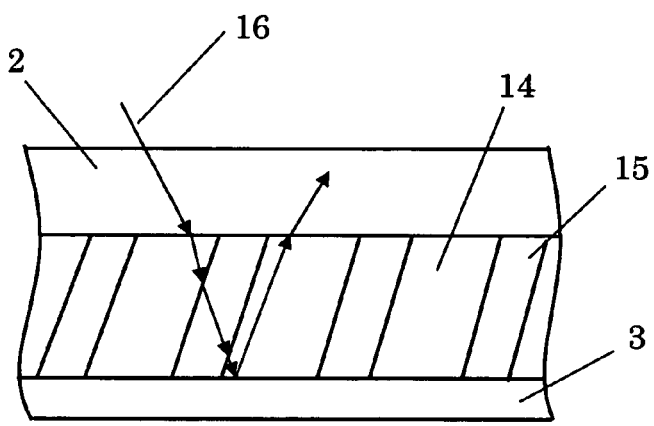
FIG. 6 is an explanatory diagram that shows an example of an optical path within a screen of the present invention.

FIG. 5 and FIG. 6 show a screen having the above-described configuration and the behavior of light incident on the screen. A clear boundary between a high index of refraction center region 14 and a low index of refraction peripheral region 15 of the column structure is shown in the figures for ease of description. However, a clear boundary does not exist between the high index of refraction region 14 and the low index of refraction region 15 when using graded index column-shaped lenses. The column-shaped lenses can be manufactured such that center axes thereof, in other words optical axes of the column-shaped lenses, have an arbitrary inclination on the order of 0 to 70 degrees with respect to a perpendicular in the film surface.

The column-shaped lens sheet can be manufactured by irradiating ultraviolet light to a liquid reaction layer through a photo mask to which gradation processing has been implemented, for example. The liquid reaction layer is made from two or more types of photopolymerization compounds having different indexes of refraction. A distribution state for the index of refraction can be controlled by differences in the polymerization speed of the photopolymerization compounds according to the intensity of the irradiated light.

An example of an optical path for incoming light to the column-shaped lens sheet from outside is explained using FIG. 5. Light projected onto the screen used by the projector enters the column-shaped lenses with a variety of angles of incidence distributed within a spread angle of the projected optical image. Referring to FIG. 5, when a stepping index column-shaped lens sheet is used, incoming light to the high index of refraction region 14 is further refracted toward a normal line direction of an incident surface of the lens sheet according to Snell's law, as shown by an optical path 12 and an optical path 13. The incoming light to the high index of refraction region 14 is incident on a boundary surface between the high index of refraction region 14 and the low index of refraction region 15. The incident light is totally reflected when the incoming angle to the boundary surface is larger than a critical angle. The incoming light is thus repeatedly reflected by the boundary surface between the high index of refraction region 14 and the low index of refraction region 15. The incident light is guided downward and is then reflected by the optical reflecting layer 3, and again guided upward and exits from the incident surface of the column-shaped lens sheet. The outgoing position and the outgoing direction of the light that exits from the column-shaped lens sheet are determined at this point by the thickness of the optical lens sheet and by the incoming angle and an incoming position of the light incident on the high index of refraction region 14. The optical path 12 and the optical path 13 of FIG. 5 have different outgoing angles at which light is guided through an inner portion of the optical lens sheet and then exits from the surface of the optical lens sheet again. This occurs because the incoming position is different for the optical path 12 and the optical path 13, even though the incoming angles are the same. A projected image from the projector is incident at a variety of incoming angles and at a variety of incoming positions. Accordingly, the projected image is subjected to an action similar to scattering it by the front surface at a certain scattering angle. The scattering angle is determined by an index of refraction difference, or by an index of refraction gradient, between the high index of refraction region 14 and the low index of refraction region 15, by the thickness of the column-shaped lens sheet, and by the lens diameter of the column-shaped lenses. In other words, the scattering angle of outgoing light becomes larger as the thickness of the column-shaped lens sheet becomes greater. Further, the scattering angle becomes larger as the angle of incidence difference between the high index of refraction region 14 and the low index of refraction region 15 becomes greater. In addition, the haze value becomes larger as the thickness of the optical lens sheet become greater, as the size of the lens radius becomes smaller, and in addition, as the number density of the column-shaped lenses within the sheet surface becomes greater. Further, when the incoming angle of light exceeds a specific angle, the incoming light propagates rectilinearly and is transmitted directly through the optical lens sheet without being scattered. An incoming angle range within which the incoming light is scattered is called a scattering incoming angle range, and an incoming angle range within with the incoming light propagates rectilinearly and is directly transmitted is called a linear transmission angle range. If the optical reflecting layer 3 is not provided, light incident at the scattering incoming angle will be scattered when transmitting through the sheet and exits.

A column-shaped lens sheet that can be used in the screen of the present invention has column-shaped lenses with a lens diameter from 0.2 µm to 500 µm, and a lens height (layer thickness of the column-shaped lens sheet) from 10 µm to 2 mm. However, when considering manufacturing yield, optical utilization efficiency, and ease of handling, it is preferable that the lens diameter be set from 5 µm to 100 µm, and that the lens height be set from 20 µm to 200 µm. Further, column-shaped lenses having an index of refraction difference between 0.01 and 0.05 can be used. Furthermore, an angle of inclination with respect to a perpendicular to the optical lens sheet surface can be arbitrarily set on the order of 0 to 70 degrees.

An example in which light enters the column-shaped lens sheet from within the linear transmission angle range is explained based on FIG. 6. Incoming light 16 is incident on an incident surface of the column-shaped lens sheet at a large incoming angle equal to or greater than the scattering incoming angle. In this cse the incoming light to the high index of refraction region 14 is refracted in an inner portion of the sheet and penetrates inward, reaching the boundary between the high index of refraction region 14 and the low index of refraction region 15. However, the incoming angle to the boundary is small, and the light is not totally reflected by the boundary before penetrating into the low index of refraction region 15. The light that penetrates into the low index of refraction region 15 again enters the high index of refraction region 14, after which the light is reflected by the optical reflecting layer 3 and exits from the incident surface of the column-shaped lens sheet to the outside. The light that exits from the incident surface is scattered when the incoming angle of the light reflected by the optical reflecting layer 3 is within the scattering incoming angle range. Further the light that exits from the incident surface is reflected specularly without scattering when the incoming angle of the light reflected by the optical reflecting layer 3 is within the linear transmission angle range. In addition, if the optical reflecting layer 3 is not present, the incoming light 16 transmits substantially linearly.

As explained above, the column-shaped lens sheet used as the directional scattering layer in the present invention possesses superior directionality. Accordingly, a very bright, sharp image can be obtained in a field of view direction toward which the light is scattered and reflected.

Returning to FIG. 1 again, the image from the projector 4 is projected within a spread angular range as indicated by a light ray 6 and a light ray 7 with the optical axis 5 taken as the center. A column-shaped lens sheet having a scattering incoming angle within the above spread of the projected image is chosen as the column-shaped lens sheet 1 used in the projector screen of the present invention. The projected optical image is thus transmitted through the transparent support substrate 2 and is then scattered evenly to a front surface following an optical path similar to that shown in FIG. 5 within the column-shaped lens sheet 1. Accordingly, a person observing the screen from the viewing point 8 will observe a bright projected image over a wide viewing angle.

On the other hand, when light from an object on the side opposite the screen as viewed from the observer is incident at an inclination with respect to the screen, the light will enter the viewing point 8 of the observer possessing the linear transmission angle of the column-shaped lens sheet. Therefore the object on the side opposite the screen, and an image projected to the screen, can be observed simultaneously by the observer provided that the reflectance of the optical reflecting layer 3 is adjusted to a low value on the order of 5 to 30%. Specifically, when the screen of the present invention is disposed in the position of a windshield in a vehicle, a driver of the vehicle can operate the vehicle while observing the foreground in front of the vehicle. Images of objects on the side opposite the screen can thus be observed in a manner similar to objects that are observed through a normal windshield. The driver can thus operate the vehicle with the sense of driving normally. Further, the projected image from the projector is a scattered image with a wide field of view angle. Accordingly, observers other than the driver can see the image at an equivalent image quality. In addition, this effect can be made more pronounced by projecting the image in a position shifted to the right or the left from the windshield directly in front of the driver.

This embodiment is explained more specifically below.

SPECIFIC EXAMPLE 1

The screen configured as shown in FIG. 1 was manufactured. While projecting a white color image, changes in the screen front surface brightness were investigated by changing the incoming angle of the optical axis of the projected image into the orientation direction of the column-shaped lens sheet. The spread angle of the white color image was ±2 degrees. A column-shaped lens sheet having lenses with a lens diameter of 20 µm and a sheet thickness of 70 µm was used as the column-shaped lens sheet. Two kinds of graded index lens sheets having orientation directions of 0 degrees and 15 degrees, respectively, and a maximum index of refraction between the high index of refraction region and the low index of refraction region of 0.02, were used. An optical reflecting layer having a reflectance of 34% was formed on a rear surface of the column-shaped lens sheet by forming approximately 19 nm of an Ag and Pd alloy using vacuum evaporation. A sample in which the column-shaped lens sheet was affixed to a 2 mm thick acrylic plate was used.

Figure 18:
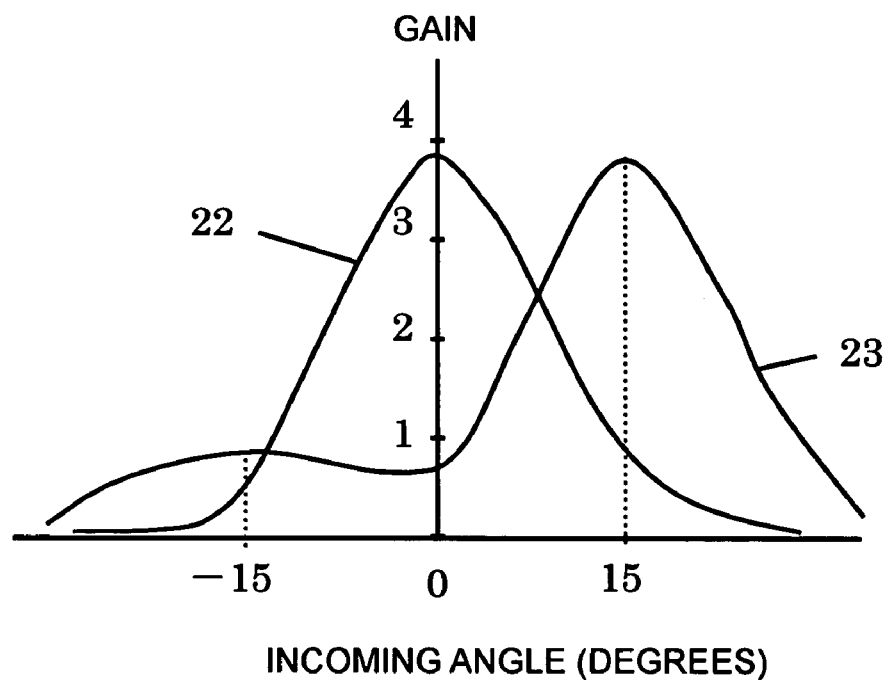
FIG. 18 is a graph that shows brightness characteristics of a screen of the present invention.

A white color image used for making measurements was irradiated to the sample while changing the incoming angle, and the intensity of light reflected from the front surface of the sample in a direction perpendicular thereto was measured. Results when similar measurements were made on a white color calibration plate were taken as a reference. The results of the measurements with the white calibration plate were set as a gain of 1. Measurement results are shown in FIG. 18. It can be seen from a curve 22 that the maximum brightness occurs at an incoming angle of 0 degrees when the orientation angle of the column-shaped lens sheet was 0 degrees, and that there was a field of view angle of 20 to 30 degrees. The gain when the incoming angle was zero reached 3.9. Further, when the orientation direction of the column-shaped lens sheet was 15 degrees, brightness peaks at 15 degrees and −15 degrees were seen. However, of the two peaks, the 15 degree peak has a value that is nearly four times as great as the −15 degree peak. The peak gain at 15 degrees was the same as that of the curve 22. The 15 degree peak corresponds to the case shown in FIG. 1, while the −15 degree peak corresponds to the case shown in FIG. 2. The −15 degree peak is a weak peak because the directionality of the scattered light is large in this case, and therefore the amount of incoming light to a measurement device installed in the front surface is small.

It can be seen from the results described above that, according to the screen of the present invention, only light projected from the projector is scattered and reflected with good efficiency, and therefore a very bright image that is not influenced by external light can be achieved. However, the gain decreases rapidly when the incoming angle of the light becomes equal to or greater than 20 degrees, and observation of the projected image becomes difficult when the incoming angle of the light exceeds 30 degrees.

Further, although there is loss due to the optical reflecting layer and there is influence of scattering from −15 degrees, images of transmitted light incident at an incoming angle equal to or less than 0 degrees can be clearly observed, and it was verified that the screen allows observation of both projected light and transmitted light.

SPECIFIC EXAMPLE 2

Figure 19:
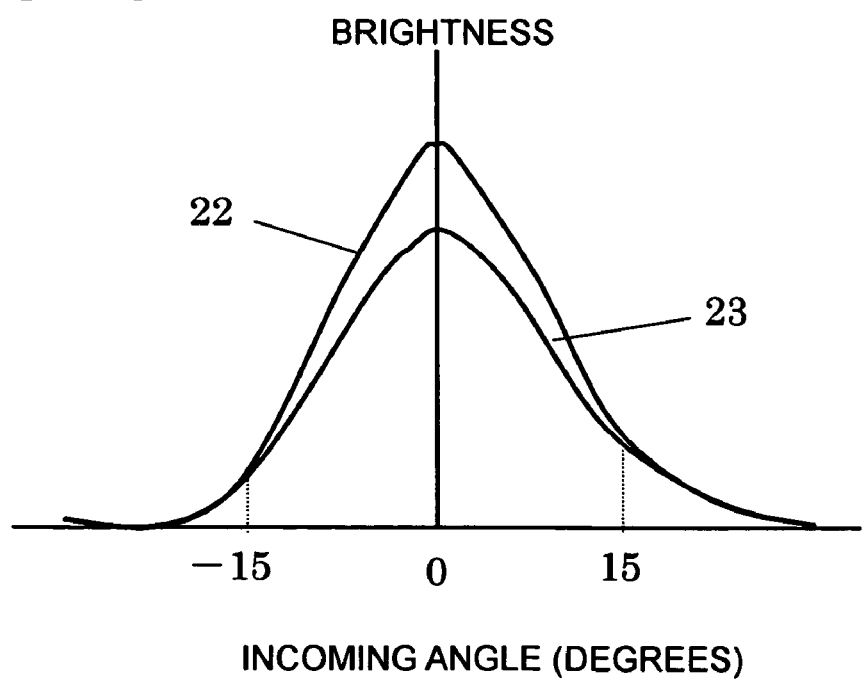
FIG. 19 is a graph that shows brightness characteristics of a screen of the present invention.

Using a structure similar to that used in Specific Example 1, changes in brightness at the front surface of the screen were investigated by changing the incoming angle of the optical axis of the white color image to be a right angle with respect to the orientation direction of the column-shaped lens sheet. Measurement results are shown in FIG. 19. The curve 22 shows a case where the orientation direction of the column-shaped lens sheet was zero degrees, while a curve 23 shows a case where the orientation direction of the column-shaped lens sheet was 15 degrees. From the results it can be seen that light projected from a direction perpendicular to the orientation direction of the column-shaped lens sheet is scattered similar to cases where the column-shaped lenses are oriented perpendicularly, regardless of the orientation angle of the column-shaped lens sheet. Further, it could be verified that transmitted light that is transmitted at an incoming angle greater than 15 degrees or less than −15 degrees can be observed without any image degradation other than losses due to the reflection layer.

Embodiment 2

Figure 2:
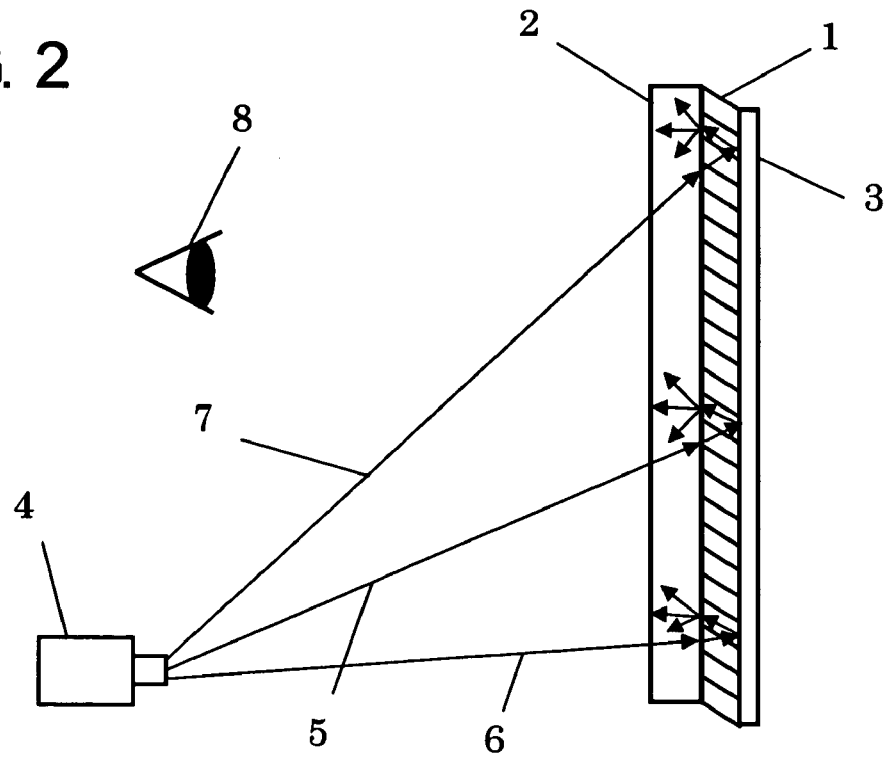
FIG. 2 is a cross sectional view that schematically shows a configuration of a screen according to the present invention.

FIG. 2 shows a configuration of a screen of this embodiment. This embodiment differs from Embodiment 1 in that the orientation direction of the column-shaped lenses substantially coincides with a direction that is symmetric with an optical axis direction of the projected optical image with respect to a perpendicular on the screen surface. In this case the projected optical image is transmitted through the transparent substrate 2, and then follows an optical path that is similar to that shown in FIG. 6 in the inner portion of the column-shaped lens sheet 1. The light reflected by the optical reflecting layer 3 takes on the scattering incoming angle, and is thus scattered uniformly in the front surface. With the structure shown in FIG. 2, optical scattering by the column-shaped lens sheet 1 occurs only in the front surface portion. Accordingly, the directionality of the scattered light is high, and the projected image can be made sharper compared to that resulting from the configuration shown in FIG. 1. The configuration of this embodiment is thus suited to high resolution image projection.

Embodiment 3

Figure 3:
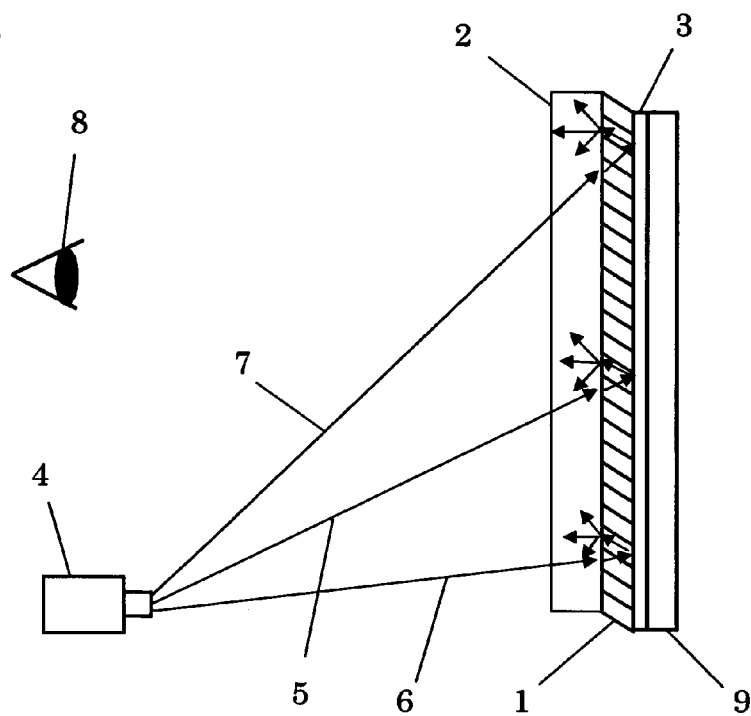
FIG. 3 is a cross sectional view that schematically shows a configuration of a screen according to the present invention.

FIG. 3 shows a configuration of a screen of this embodiment. This configuration is similar to that shown in Embodiment 2, with the addition of a support substrate 9 on the outer side of the optical reflecting layer 3. The optical reflecting layer 3 is protected from external dynamic forces by using this type of configuration. It therefore becomes possible to prevent damage to the optical reflecting layer 3.

Further, as in the configurations of FIG. 1 and FIG. 2, the reflectance of the optical reflecting layer 3 increases by using a metallic film having a film thickness equal to or greater than 200 nm as the optical reflecting layer 3 in the configuration shown in FIG. 3. As a result, the utilization efficiency of light can be increased. However, image glare may increase when the intensity of the optical image from the projector is large, and there is a possibility that the naturalness of the display image will be impaired. The image quality can be remarkably improved, however, by reducing the reflectance of the optical reflecting layer 3 used in the configuration shown in FIG. 3 to a level from 5 to 30%, and by using a light absorbing support substrate, for example a black color support substrate. The low reflectance optical reflecting layer 3 can be achieved easily by forming a high index of refraction layer, such as $TiO_2$ or $ZrO_2$ layer, on the column-shaped lens sheet or the support substrate, or by forming an optical multilayer film in which a low index of refraction layer such as $SiO_2$ is combined with the high index of refraction material. Further, a metallic thin film having a film thickness on the order of 10 to 20 nm may also be formed by evaporation. Using the light absorbing support substrate 9 is effective in improving image quality even when the reflectance of the optical reflecting layer 3 is greater than 30%.

Further, when the intensity of the projected optical image from the projector is relatively weak, and when the projected optical image has little glare, a metallic support substrate whose optical reflecting surface is processed into a mirrored surface can be used as a substitute for forming the optical reflecting layer.

This embodiment of the present invention is explained in more detail below.

SPECIFIC EXAMPLE 3

A projector screen having the configuration shown in FIG. 3 was manufactured. While projecting a white color image, changes in the brightness of the rear surface perpendicular to the screen were investigated by changing the incoming angle of the optical axis of the projected image into the orientation direction of the column-shaped lens sheet. The spread angle of the white color image was ±2 degrees.

A column-shaped lens sheet having lenses with a lens diameter of 50 μm and a sheet height of 90 μm was used as the column-shaped lens sheet. Two kinds of graded index sheets having orientation directions of 0 degrees and 15 degrees, respectively, and a maximum index of refraction between the high index of refraction region and the low index of refraction region of 0.02, were used. A sample in which the column-shaped lens sheet was affixed to a 2 mm thick acrylic plate was used.

Figure 20:
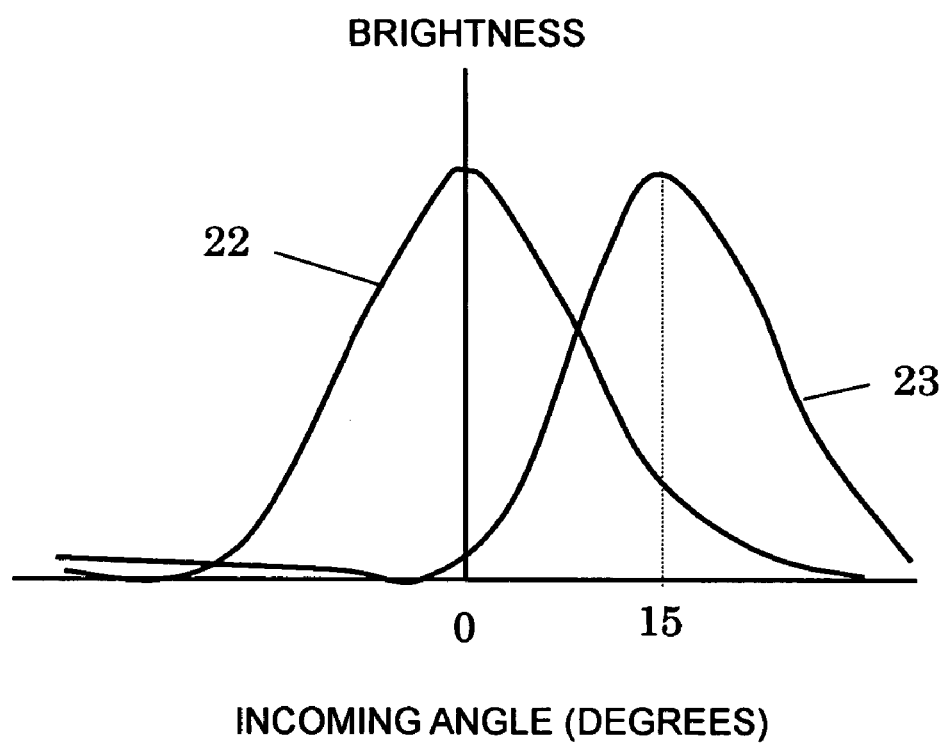
FIG. 20 is a graph that shows brightness characteristics of a screen of the present invention.

Measurement results are shown in FIG. 20. The curve 22 shows a case in which the orientation direction of the column-shaped lens sheet was 0 degrees, while the curve 23 shows a case where the orientation direction of the column-shaped lens sheet was 15 degrees. Results similar to those seen in Embodiment 1 and Embodiment 2 were obtained for the projected image brightness when the orientation direction of the column-shaped lens sheet was 0 degrees. However, a sharper image having only one brightness peak was obtained when the orientation direction of the column-shaped lens was 15 degrees.

Further, objects other than the projected image from the projector were also allowed to transmit for observation. Images of such objects were observed with greater visibility by interrupting projection of the image from the projector.

Embodiment 4

Figure 4:
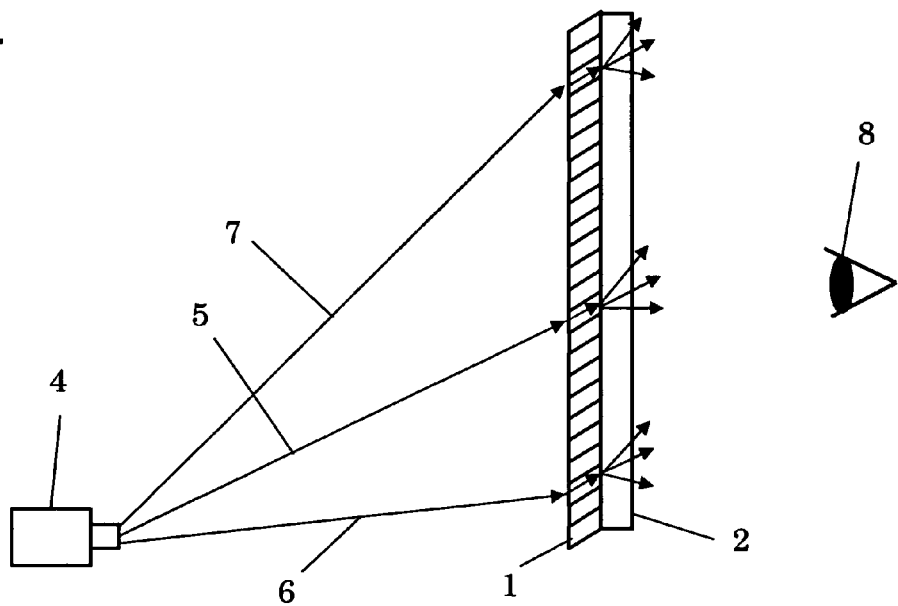
FIG. 4 is a cross sectional view that schematically shows a configuration of a screen according to the present invention.

FIG. 4 shows a configuration of a screen of this embodiment. The column-shaped lens sheet 1 is joined to one surface of the transparent support substrate 2 in the screen of this embodiment. The orientation direction of the column-shaped lens sheet 1 substantially coincides with the optical axis 5 of the optical image from the projector 4. It should be noted that the viewing point 8 of the observer is on a side opposite the projector 4, with the screen therebetween, with this configuration. This type of screen is called a rear projection screen. The projector screen of the present invention can thus be used as a rear projection screen, and is not limited to being used as a front projection screen. With the configuration shown in FIG. 4, the optical image projected from the projector 4 is incident on the column-shaped lens sheet 1 within the scattering angle range, and exits from the column-shaped lens sheet 1 at a specific scattering angle. Such scattering occurs due to actions similar to those illustrated in FIG. 5 and FIG. 6. The projected image can therefore be observed at the viewing point 8 at a wide viewing angle.

On the other hand, other than the optical images projected from the projector 4, light from objects which is incident at the linear transmission angle also arrives at the viewing point 8 after having been transmitted by the screen without being scattered. The observer can thus directly observe not only projected images from the projector 4 but also objects behind the screen.

It becomes possible to project a sharper image with each of the configurations explained in Embodiments 1 to 4 by forming black stripes on the front surface of the column-shaped lens sheet having the same pitch as a pixel pitch of the image projected. The black stripes can be easily formed by printing using a binder into which a black color dye, such as a light absorbing dye, or a pigment, such as carbon, is mixed. The black stripes may be formed on any surface of the column-shaped lens sheet. However, it is preferable to form the black stripes on a surface opposite the viewing point 8 in the case of a front projection screen, and on a surface on the same side as the viewing point 8 in the case of a rear projection screen.

Further, the following sheets can be used as sheets having functionality similar to the black stripes. That is, a sheet in which a layer into which a light absorbing pigment or dye is mixed and a transparent payer are laminated alternately may be applied to a front surface of a transparent substrate. Carbon powder can be used as the light absorbing pigment. A sheet in which black color regions and transparent regions are alternately laminated is known as a louver.

It should be noted that, even if the pitch of the black stripes is from several times to several tens of times larger than the pixel pitch, the visibility will be improved compared to the case where no black stripes are present.

Further, the contrast of the projected image can be increased in all of the configurations explained in Embodiments 1 to 4 by affixing a polarizing sheet to the viewing point 8 side surface of the support substrate 2 when image modulating elements of the projector 4 use polarization elements such as liquid crystal elements. When using this type of projector, the projected optical image will be projected as light that is polarized with respect to a specific direction. Therefore, when the polarization axis of the polarizing sheet is aligned with the polarization direction of the projected optical image, there will be little optical loss in the projected image from the polarizing projector. On the other hand, half of the external light that is incident on the screen from the viewing point 8 side is absorbed by the polarizing sheet, and therefore the contrast increases. It should be noted that when projecting a color image with the polarizing projector, this effect becomes remarkable only when the polarization directions of red, green, and blue (RGB) pixels are the same.

Figure 8:
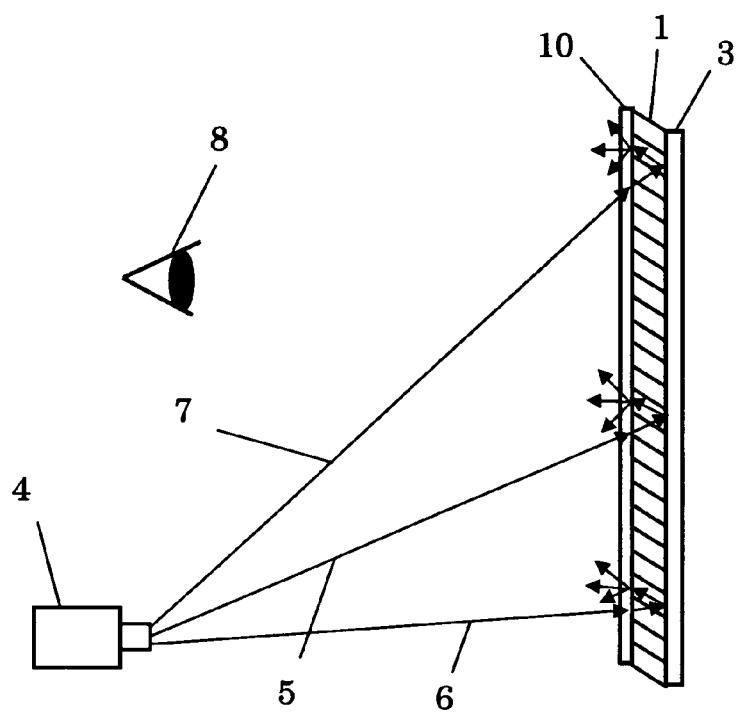
FIG. 8 is a cross sectional view that schematically shows an example of a configuration of a screen according to the present invention.

On the other hand, when an image is observed from a direct reflection region where the intensity of light projected from the projector 4 is strong, moiré fringes may occur due to the multiple reflections of reflected light within the screen. In order to prevent the moiré fringes, as shown in FIG. 8, an optical diffusing layer 10 may be formed on the viewing point side surface of the column-shaped lens sheet 1. The amount of light that is directly reflected by the surface of the column-shaped lens sheet 1 and returns to the inside of the screen can thus be decreased. As a result, moiré fringes can be prevented even in the direct reflection region where the intensity of the projected optical image is strong.

Figures 7A, 7B, 7C:
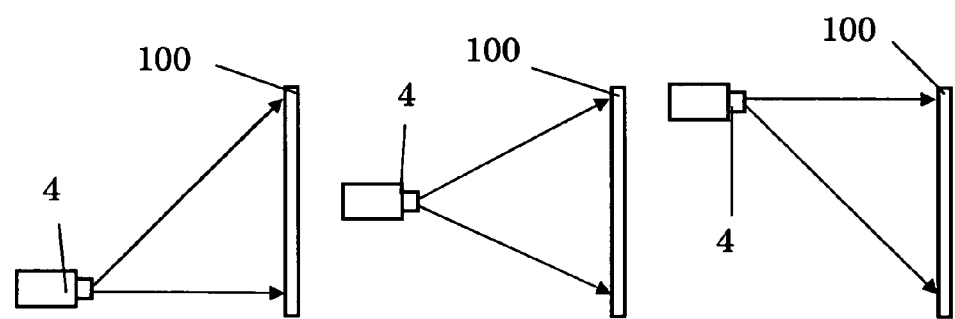
FIG. 7A is a diagram that explains an arrangement of a lower position projector.
FIG. 7B is a diagram that explains an arrangement of a center position projector.
FIG. 7C is a diagram that explains an arrangement of an upper position projector.

A relationship between the position of the projector and the position of the screen differs according to the projection environment. FIGS. 7A to 7C schematically show such positional relationships. In FIG. 7A the projector 4 is disposed below a screen 100, in FIG. 7B the projector 4 is disposed at the same height as the screen 100, and in FIG. 7C the projector 4 is disposed above the screen 100. The arrangements shown in FIGS. 7A, 7B, and 7b are called a lower position, a center position, and an upper position, respectively. The configurations explained using FIGS. 1 to 4 all correspond to lower position cases. The projector screen of the present invention can be applied to all of the arrangements described above. It is very important that the orientation direction of the column-shaped lenses within the column-shaped lens sheet roughly coincide with the optical axis direction of the projected image or that the orientation direction of the column-shaped lenses roughly coincide with a direction that is symmetric with the optical axis direction with respect to a perpendicular on the screen. Alternatively, it is important that the orientation direction of the column-shaped lenses within the column-shaped lens sheet roughly coincide with a viewing point direction, or the orientation direction of the column-shaped lenses roughly coincide with a direction that is symmetric with the viewing point direction with respect to a perpendicular on the screen. Further, it is important that the incoming angle of the projected optical image be in the scattering incoming angle range of the column-shaped lens sheet used in the projector screen.

The orientation direction of the column-shaped lens sheet of the screen used in the arrangement shown in FIG. 7C can be set to a direction similar to that shown in FIGS. 1 to 3. With the rear projection screen of FIG. 4, however, it is necessary to make the orientation direction of the column-shaped lenses roughly coincide with a direction that is symmetric with the optical axis direction with respect to a perpendicular on the screen surface. The orientation direction of the column-shaped lens sheet used with the arrangement shown in FIG. 7B is therefore a direction perpendicular to the surface of the column-shaped lens sheet.

Figure 9:
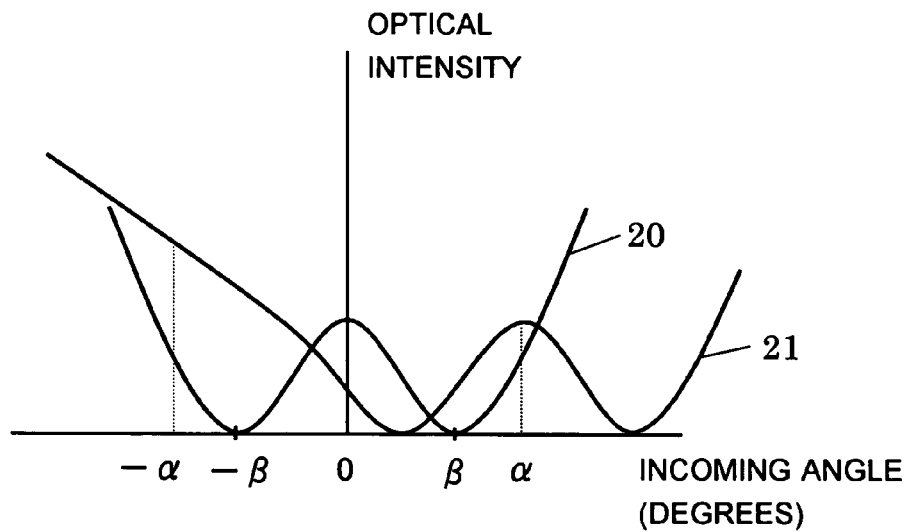
FIG. 9 is a graph that shows characteristics of a column-shaped lens sheet used in the present invention.

FIG. 9 shows light transmittance characteristics of the column-shaped lens sheet used by the present invention. Referring to FIG. 9, a horizontal axis shows the incoming angle of light to the column-shaped lens sheet, while the vertical axis shows the intensity of light transmitted at each incoming angle. A characteristic curve 20 in FIG. 9 shows characteristics of the column-shaped lens sheet when the orientation direction is 0 degrees, and a characteristic curve 21 shows characteristics of the column-shaped lens sheet when the orientation direction is a degrees. It should be noted that measurements were taken in the ambient atmosphere. The characteristic curve 20 shows that the light intensity is substantially zero for the column-shaped lens sheet at angles of $\pm\beta$. When the incoming angle is within a range from $-\beta$ to $\beta$, light is transmitted while scattering, and when the absolute value of the incoming angle is greater than $\beta$, light is transmitted linearly without scattering. In other words, the incoming angle within a range from $-\beta$ to $\beta$ is the scattering incoming angle, and that outside the range from $-\beta$ to $\beta$ is the linear transmission angle. The angle $\beta$ is called the scattering incoming angle here to make the discussion easier.

On the other hand, the characteristic curve 21 shows that, when the orientation direction of the column-shaped lenses is inclined at an angle of $\alpha$, the range of the scattering incoming angle is shifted by an amount $\alpha$ compared to the cases where the orientation direction is zero degrees. The angular range of the scattering incoming angle does not change substantially at this point. The scattering incoming angle range shifts to a range from $(\alpha-\beta)$ to $(\alpha+\beta)$ Therefore, in FIG. 9, light incident at the angle $\alpha$ is scattered during transmission, while light incident at the angle $-\alpha$ is transmitted linearly without being scattered. A bright image having a wide field of view angle can therefore be obtained by irradiating the optical image from the projector at an incline of a with respect to the screen, and by setting the spread angle of the projected image to $\pm\beta$. The characteristics described above correspond to the characteristics of cases where light is transmitted through the projector screen of the present invention (rear projection screens).

A front projection screen involving reflection is explained next using FIG. 9. First, projected light from the projector which is incident at an angle from $-\beta$ to $\beta$ is reflected by the reflecting layer of the projector screen and scattered when the orientation direction is 0 degrees (the characteristic curve 20). However, when $\gamma$ is taken as an angle larger than $\beta$, light incident at the incoming angle $\gamma$ is reflected specularly, without scattering. Accordingly, external incoming light having an incoming angle equal to or greater than $\beta$ does not impart any influence on the projected image, and a projected image having good image quality can be obtained. Next, when using a column-shaped lens sheet having an orientation direction inclined by $\alpha$ (the characteristic curve 21), optical images projected from the projector having an incoming angle in a range from $(\alpha-\beta)$ to $(\alpha+\beta)$ are scattered and reflected. Further, light projected from the projector having an incoming angle in a range from $(-\alpha-\beta)$ to $(-\alpha+\beta)$ follows an optical path similar to light having an incoming angle in the range from $(\alpha-\beta)$ to $(\alpha+\beta)$, and is thus scattered by the front surface and exits. In other words, two angular ranges exist where light is scattered by the screen, as discussed above. On the other hand, incoming light at an angle outside the two scattering incoming angle ranges is scattered in the optical scattering layer, but is linearly reflected by the column-shaped lens sheet. Therefore external light incident at an angle outside the two scattering incoming angle ranges imparts little influence to the projected image, and a projected image having good image quality can be obtained. The value of $\beta$ can be controlled to be an arbitrary value on the order of 10 to 45 by adjusting the film thickness of the column-shaped lens sheet, the diameter of the column-shaped lenses, the index of refraction difference between the column-shaped lenses, and the like.

A base member is used in each of the configurations explained above. However, it is not always necessary to use a base member as shown in FIG. 8 when the column-shaped lens sheet is as thick as 0.2 to 2 mm.

Embodiment 5

Figure 10:
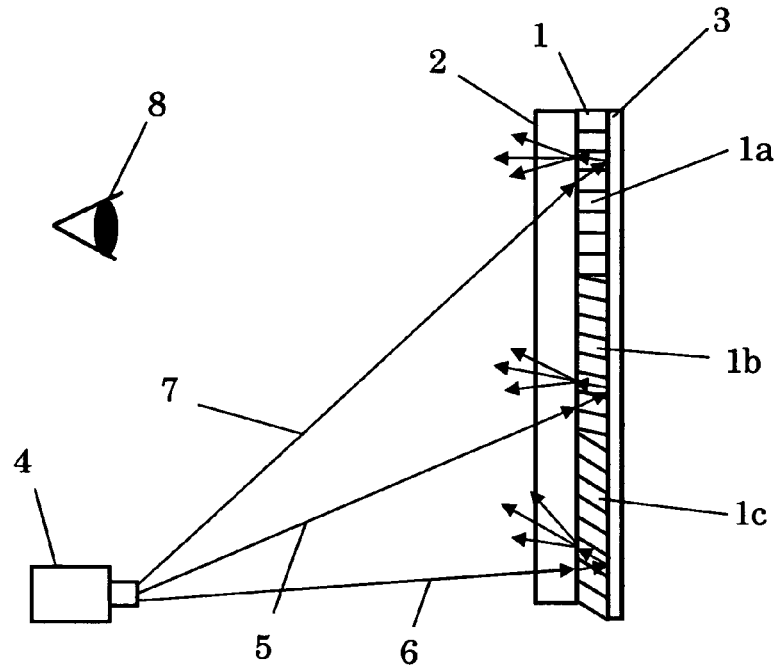
FIG. 10 is a cross sectional view that schematically shows a configuration of a screen according to the present invention.
Figure 11:
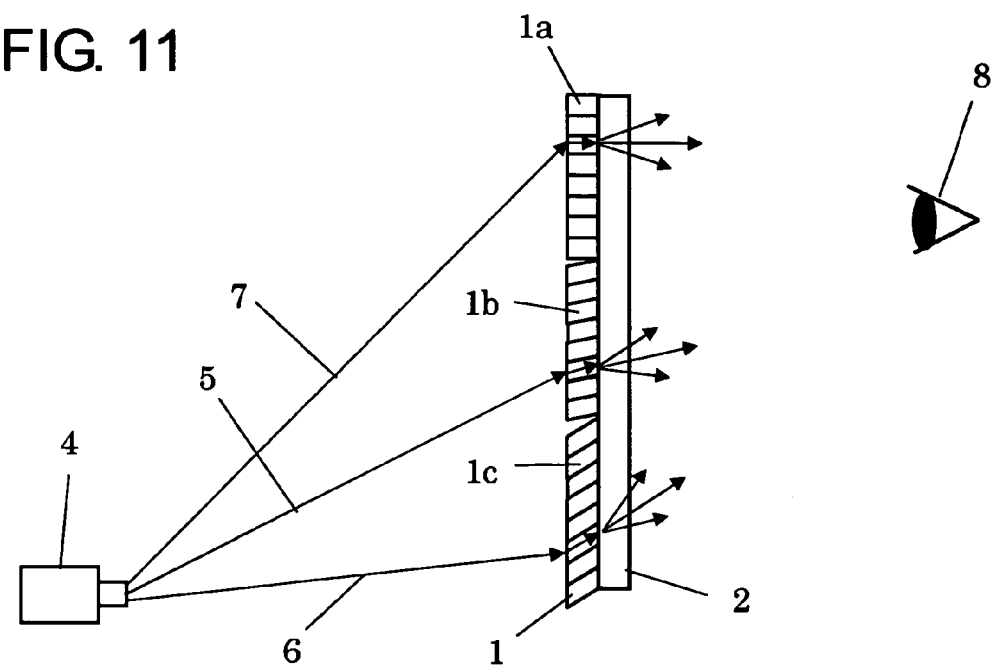
FIG. 11 is a cross sectional view that schematically shows a configuration of a screen according to the present invention.

A projector screen of this embodiment is explained next using FIGS. 10 and 11. FIG. 10 shows a configuration of a front projection screen, while FIG. 11 shows a configuration of a rear projection screen. The column-shaped lens sheet 1 includes a plurality of partial column-shaped lens sheets 1a, 1b, and 1c, and the orientation directions of the plurality of column-shaped lenses each correspond approximately with the direction of the viewing point 8. In other words, the first partial column-shaped lens sheet 1a is made from a column-shaped lens group having an orientation direction that is substantially vertical, the second partial column-shaped lens sheet 1b has an orientation direction that is inclined slightly upward, and the third partial column-shaped lens sheet 1c has an orientation direction that inclines further upward than that of the second portion column-shaped lens sheet 1b. This is a structure in which the inclination angle thus differs according to the angle of the optical axis of the optical image projected from the projector 4 and according to the position of the viewing point. Each of the partial column-shaped lens sheets 1a, 1b, and 1c is inclined in the direction of the viewing point 8, and the optical image therefore scatters with the direction of the viewing point 8 as a scattering angle center. As a result, light having good directionality is scattered toward the observer in a wide region on the viewing point side. Accordingly, a person observing the screen from the viewing point 8 will observe a bright projected image having a good field of view angle.

Figures 12, 13:
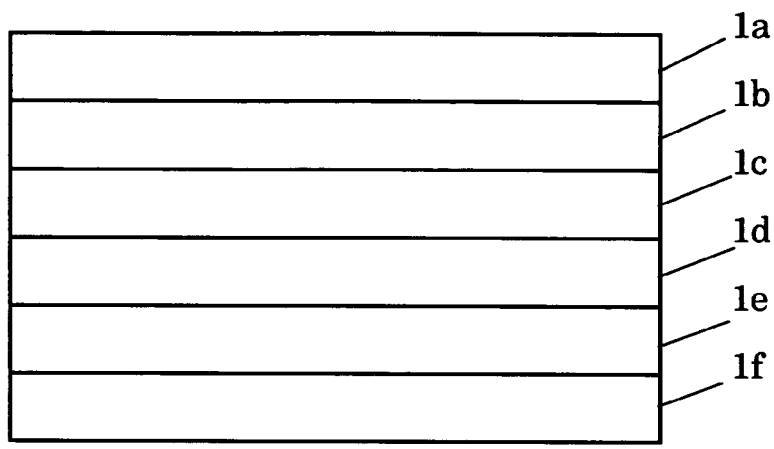
FIG. 12 is a planar view that schematically shows an arrangement of partial column-shaped lens sheets.
FIG. 13 is a planar view that schematically shows an arrangement of partial column-shaped lens sheets.

FIG. 12 shows an example of an arrangement of partial column-shaped lens sheets configuring the column-shaped lens sheet used in the screen of this embodiment. Referring to FIG. 12, the partial column-shaped lens sheets are sectioned into belt shapes and arranged in a row direction, joined to the support substrate (not shown) without any gaps between the column-shaped lens sheets. The number of the belt shape partial column-shaped lens sheets used may be adjusted in consideration of the screen size and the distance from the screen to the viewing point. Column-shaped lenses that configure each of the belt shape partial column-shaped lens sheets are inclined in sequence in the viewing point direction, similarly to the explanation made using FIGS. 10 and 11.

FIG. 13 shows another example of an arrangement of partial column-shaped lens sheets that configure a column-shaped lens sheet. Partial column-shaped lens sheets 1*aa* through 1*fe* are arranged in a matrix shape here. Column-shaped lenses that configure each of the partial column-shaped lens sheets all have an inclination angle in the direction of the viewing point 8, and the incoming angle of the projected optical image is set to be within the scattering incoming angle ranges thereof. By thus arranging the partial lens sheets in a matrix shape, not only do the viewing angle characteristics in an upward and downward direction of the screen improve, but in addition, the viewing angle characteristics in a left and right direction of the screen can similarly be improved. A flexible screen able to handle a variety of image environments can thus be made.

Referring to FIGS. 10 and 11, when the column-shaped lens sheet is configured by using partial column-shaped lens sheets, the brightness differs in each of the partial column-shaped lens sheets and brightness unevenness may develop in the projected image when the scattering incoming angles and the haze values are the same among the respective partial column-shaped lens sheets. In general, the scattering angle range also becomes smaller when the scattering incoming angle of the column-shaped lens sheet becomes smaller. On the other hand, the haze value of the column-shaped lens sheet may be increased in order to increase the brightness of the column-shaped lens sheet. Further, even if the brightness of the surface of the screen is low, an image on the screen can be brightly viewed when the scattering angle range covers the viewing direction. Considering issues like those described above, a ratio between the scattering incoming angle of the partial column-shaped lens sheet and the haze value is set to become substantially fixed so that an image can be projected having a uniform brightness over a wide viewing angle range. In other words, when the scattering incidence angle is small, the haze value is made lower, and when the scattering incidence angle is large, the haze value is set higher. Specifically, in the arrangement shown in FIG. 10, for example, the partial column-shaped lens sheet in the upper portion of the screen must have a large scattering incoming angle, and the haze value may then also be set higher. Further, the partial column-shaped lens sheet in the lower portion of the screen may have a small scattering incoming angle, and the haze value may thus be set to a low value.

Embodiment 6

Figure 14:
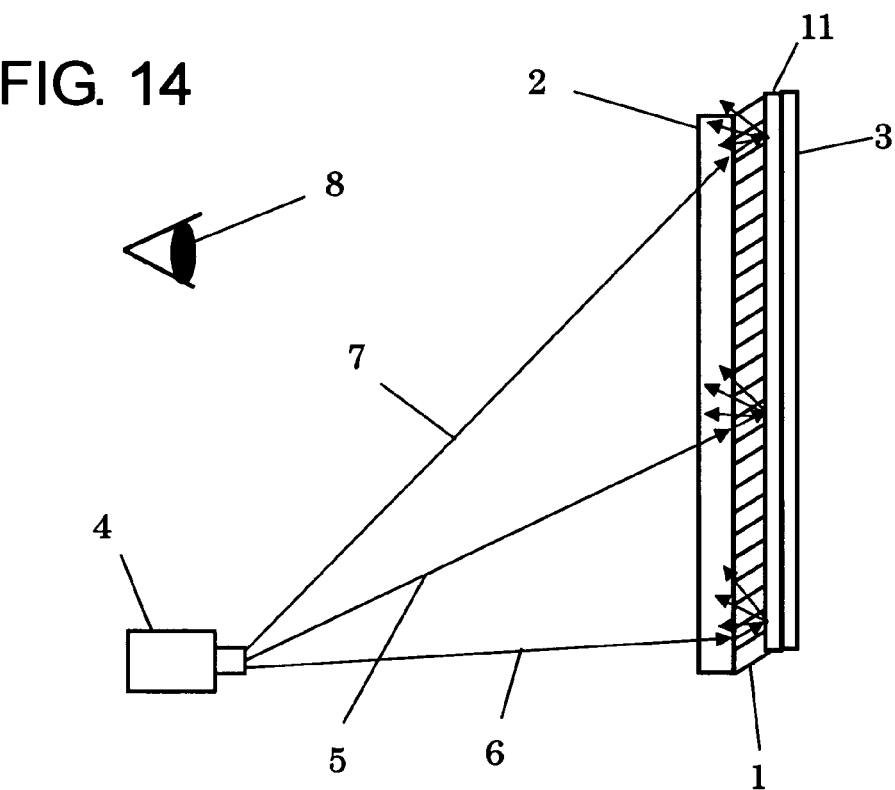
FIG. 14 is a cross sectional view that schematically shows a configuration of a screen according to the present invention.

A configuration of a projector screen of this embodiment is explained using FIG. 14 next. In the configuration, an optical diffusing layer 11 is formed between the column-shaped lens sheet 1 and the optical reflecting layer 3 of Embodiment 1. The column-shaped lens sheet 1 used by the present invention possesses superior directionality. Accordingly, a high brightness, clear image can be obtained in the field of view direction toward which light is scattered and reflected. However, in directions in which light is not scattered and reflected, the brightness of the projected image declines rapidly, and the viewing characteristics become poor. The optical diffusing layer 11 compensates for a characteristic in which the high directionality possessed by the column-shaped lens sheet causes the field of view angle to become small. The optical diffusing layer 11 acts to expand the field of view angle, and is disposed in the rear surface of the column-shaped lens sheet 1, causing light that passes through the optical diffusing layer 11 to diffuse. Among the diffused light, when the incoming angle of the light incident on the column-shaped lens sheet 1 is again in the scattered incoming angle range, the light scatters when exiting from the surface of the column-shaped lens sheet 1. When the incoming angle of the light is in the linear transmission angle range, the light does not scatter at the surface of the column-shaped lens sheet 1, exiting linearly. The screen of this embodiment therefore possesses both a wide field of view scattering characteristic according to the optical diffusing layer 11, and a scattering characteristic having directionality according to the column-shaped lens sheet 1. As a result, images projected to the screen from a wide field of view direction can be seen, not only those projected to the screen from the light scattering direction of the column-shaped lens sheet 1. This is due to the superior performance of the projector screen of the present invention that uses a column-shaped lens sheet possessing both the scattering incoming angle and the linear transmission angle regions.

The optical diffusing layer 11 can easily be obtained by mixing resin beads or inorganic beads into a binding agent or adhesive agent, the beads having a different index of refraction than that of the binding agent or adhesive agent. The haze value of the optical diffusing layer 11 can be changed to an arbitrary value on the order of 1 to 95% by changing the mixing density, the particle size of the beads, the material used, or the like. A binding agent of this type is called a diffusion binding agent.

An anti-gray structure in which a fine irregular structure is formed on the front surface of the column-shaped lens sheet 1 may also be used in another method of forming the optical diffusing layer 11. It is possible to manufacture the column-shaped lens sheet 1 by exposing ultraviolet light to a liquid reactive layer on a processing stage having an irregular surface that corresponds to the irregular structure. The liquid reactive layer is made from two or more photopolymerization compounds having different indexes of refraction, and the ultraviolet light is irradiated through a photo mask that has undergone gradation processing. The index of refraction distribution can be controlled by differences in the photopolymerization speed of the photopolymerization compounds according to the intensity of the irradiated light. The haze value of the light scattering layer can be arbitrarily controlled by changing the roughness, the fineness, or the formation density of the irregularities.

Further, it is also possible to form the optical diffusing layer 11 by forming the optical reflecting layer 3 on a substrate that possesses an irregular surface using a vacuum evaporation method, a plating method, or the like. A transparent resin sheet or glass having a surface that has undergone irregularity processing can be used as the substrate on which the optical reflecting layer 3 is formed. Irregularity processing may also be performed on a metallic surface having a high reflectance.

Referring to FIG. 14, the image from the projector 4 is projected with a spread angular range as indicated by a light ray 6 and a light ray 7 with an optical axis 5 as the center. The scattering incoming angle of column-shaped lens sheet 1 is selected to be within the spread angular range of the projected image and used for the projector screen of the present invention. A projected optical image is thus transmitted through the transparent substrate 2, following an optical path similar to that shown in FIG. 5 within the optical lens sheet 1, and is scattered uniformly at the front surface. Accordingly, a person observing the screen from the viewing point 8 will observe a clear projected image having a wide field of view angle. However, in this case the transmitted light may be scattered and become difficult to see if the haze value of the optical diffusing layer 11 is high. It is thus desirable that the haze value of the optical diffusing layer be about 20% or less. Further, the field of view angle can also be expanded by forming the optical diffusing layer on a rear projection screen, not only a front projection screen.

Embodiment 7

Figure 15:
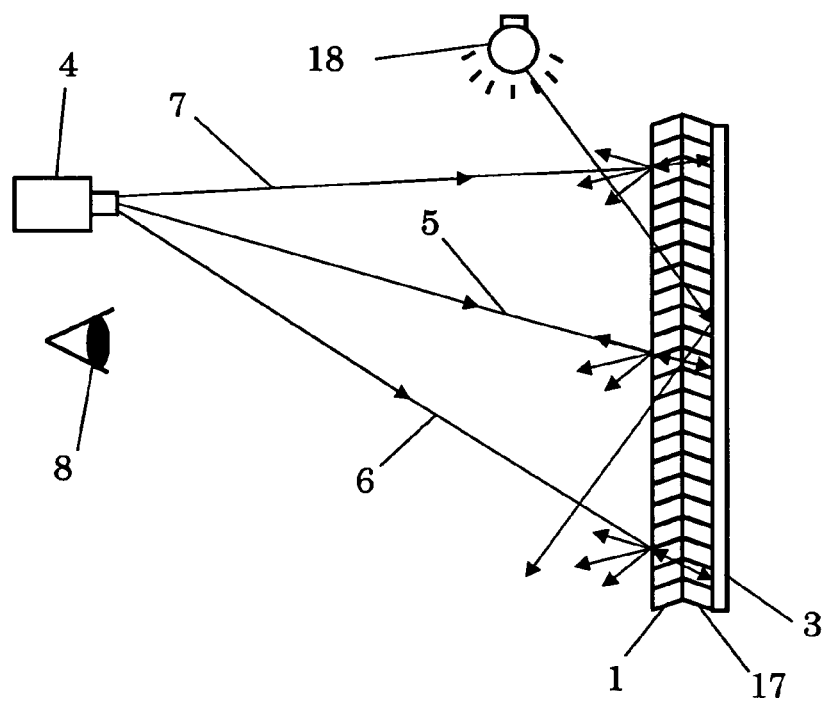
FIG. 15 is a cross sectional view that schematically shows a configuration of a screen according to the present invention.

A screen of this embodiment is explained next using FIG. 15, FIG. 16, and FIG. 17. Referring to FIG. 15, a second column-shaped lens sheet 17 is formed on a rear surface of the column-shaped lens sheet 1. Images from the projector 4 are spread within a spread angular range as indicated by the light ray 6 and the light ray 7, with the optical axis 5 taken as the center. The scattering incoming angle of the column-shaped lens sheet 1 is set to be within the spread range of the projected image. By using this type of configuration, light follows the optical path shown in FIG. 5 within the column-shaped lens sheet 1 and is reflected by the optical reflecting layer 3 provided on the rear surface of the second column-shaped lens sheet 17. The light is then transmitted through the second column-shaped lens sheet 17 and is scattered from the front surface of the column-shaped lens sheet 1 toward the viewing point 8 side at a scattering angle that corresponds to the scattering incoming angle. Accordingly, a person observing the screen from the viewing point 8 can observe a bright projected image at a wide field of view angle. On the other hand, light from an illumination device 18 above the screen with respect to the observer is incident on the screen at the linear transmission angle of the column-shaped lens sheet 1 and the linear transmission angle of the second column-shaped lens sheet 17, and thus follows an optical path similar to that of light reflected by a normal mirror. The light from the illumination device 18 therefore does not enter the viewing point 8 of the observer. The observer can see a sharp image, having high contrast, which is not influenced by light from the illumination device.

A layer formed by evaporating a metal such as an Ag alloy or an Al alloy on a polymer film, and a layer in which a metal oxide white color pigment is mixed into a polymer film can be used as the optical reflecting layer 3. In addition, an Ag alloy or an Al alloy may also be evaporated directly onto the rear surface of the second column-shaped lens sheet 17, and a mirror-finished metallic plate may also be used. Further, end portions of the column-shaped lens sheet 1 and the second column-shaped lens sheet 17 may be mechanically fixed in order to determine the positions of the column-shaped lens sheets. The column-shaped lens sheets may also be joined together by using an adhesive. If the column-shaped lens sheets are arranged without being joined together, a sharper image can be obtained by making a gap between the column-shaped lens sheet 1 and the second column-shaped lens sheet 17 constant, and also making the gap as small as possible. It is preferable to arrange the column-shaped lens sheets in an adhering state when possible.

It becomes possible to display a projected image at a wide scattering angle obtained by combining the scattering angles of the column-shaped lens sheet 1 and the second column-shaped lens sheet 17 when using this configuration. It thus becomes possible to project a very bright, wide field of view angle image. However, when the difference in inclination angle between the column-shaped lens sheet 1 and the second column-shaped lens sheet 17 exceeds their respective scattering incoming angle ranges, a region of extremely poor image visibility develops on the front surface of the screen. Accordingly, it is very important that the difference between the field of view angles be within their respective scattering incoming angle ranges.

For cases where the intensity of the projected image form the projector 4 is sufficiently strong, an image having good visibility can be displayed by setting the light reflectance of the optical reflecting layer 3 low at 30 to 70%, and by using a light absorbing black color support substrate as the support substrate 10. Such arrangement is suited to projecting an image to medium and small size screens on the order of 20 inches and smaller. The size of the column-shaped lenses that constitute the column-shaped lens sheets used in the present invention is small at several tens of micrometers. Accordingly, a sharp image having high resolution can be displayed even when displaying the image on a medium or small size screen.

Figure 16:
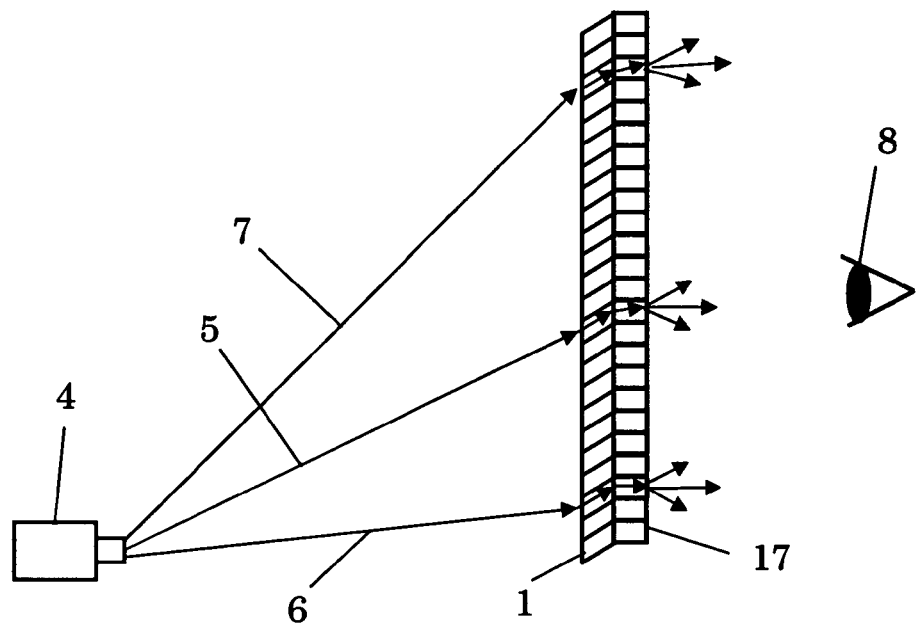
FIG. 16 is a cross sectional view that schematically shows a configuration of a screen according to the present invention.

Next, FIG. 16 shows the cross sectional structure of a rear projection screen that uses the column-shaped lens sheet 1 and the second column-shaped lens sheet 17, together with the arrangement of the projector 4. Referring to FIG. 16, an optical image from the projector 4 is projected onto the screen having the column-shaped lens sheet 1 and the second column-shaped lens sheet 17 that are joined together. The projected image is observed from the viewing point 8 of the observer on the side opposite the projector, with the screen therebetween. With the configuration shown in FIG. 16, the orientation direction of the column-shaped lenses in the column-shaped lens sheet 1 substantially coincides with the direction of the optical axis 5 of the optical image projected from the projector 4. In other words, the column-shaped lenses are arranged within the plane of the column-shaped lens sheet 1 so as to be inclined downward. Further, the orientation direction of the second column-shaped lens sheet 17 substantially coincides with the direction of the viewing point 8.

Images from the projector 4 are projected within a spread angular range as indicated by the light ray 6 and the light ray 7, with the optical axis 5 as the center. The scattering incoming angle of the column-shaped lens sheet 1 is set to be within the spread of the projected image. By using this type of configuration, light follows the optical path shown in FIG. 5 within the column-shaped lens sheet 1 and exits from the front surface of the second column-shaped lens sheet 17 and is scattered to the viewing point 8 side at a scattering angle corresponding to the scattering incoming angle. Accordingly, a person observing the screen from the viewing point 8 will observe a bright projected image having a wide field of view angle. On the other hand, light from objects above the screen on the opposite side of the observer is incident on the screen at the linear incoming angles of the column-shaped lens sheet 1 and the second column-shaped lens sheet 17, thus arriving at the viewing point 8 of the observer. The observer can observe the objects on the opposite side of the screen and the images projected to the screen at the same time.

Specifically, when the projector screen of the present invention is disposed in the position of a windshield in a vehicle, a driver of the vehicle can operate the vehicle while observing the foreground in front of the vehicle. Images of objects on the side opposite to the screen can thus be observed in a manner similar to objects that are observed through a normal windshield. The driver can thus operate the vehicle with the sense of driving normally. Further, the projected image from the projector is a scattered image with a wide field of view angle. Accordingly, observers other than the driver can see the image at an equivalent image quality. In addition, this effect can be made more pronounced by projecting the image in a position shifted to the right or the left from the windshield directly in front of the driver.

Figure 17:
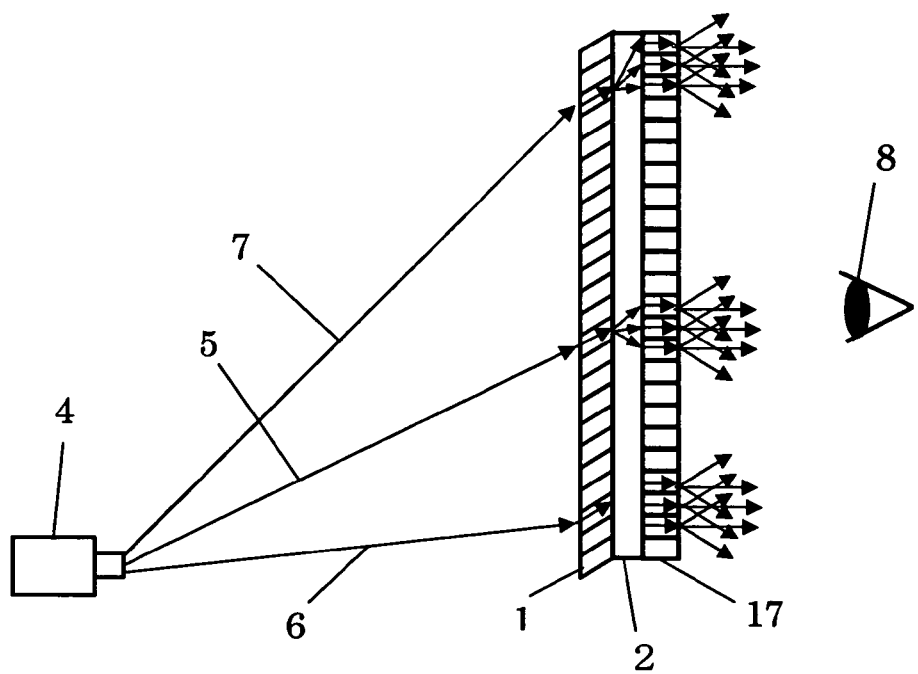
FIG. 17 is a cross sectional view that schematically shows a configuration of a screen according to the present invention.

Next, FIG. 17 shows a screen in which the column-shaped lens sheet 1 and the second column-shaped lens sheet 17 are joined through the transparent support substrate 2. With this configuration, light that is scattered and exits from a specific column-shaped lens of the column-shaped lens sheet 1 is incident on a plurality of the column-shaped lenses of the second column-shaped lens sheet 17, and is again scattered. As a result, an action similar to a blurring process acts on the image projected on the screen, and a smooth image without reflected glare of liquid crystal pixels within the projector can be displayed. However, if the plate thickness of the transparent support substrate 2 is made too large, the image will become blurry and loose sharpness. Accordingly, it is preferable that the plate thickness of the transparent support substrate 2 be set to a thickness equal to or less than the size of the image pixels.

In the foregoing, embodiments of the present invention configured by using a column-shaped lens sheet as a directional scattering layer have been described. However, a layered sheet in which the layers have different indexes of refraction may also be used as the directional scattering layer, and a resin substrate in which through holes are formed in a thickness direction thereof may also be used as the directional scattering layer. Further, transparent fibers may also be provided as a substitute for the column-shaped lenses. In addition, a liquid crystal polymer in which nematic liquid crystals, cholesteric liquid crystals, discotic liquid crystals, smectic liquid crystals, or the like are disposed may also be used. That is, any layer that scatters light that is incident within a specific angular range, while transmitting light that is incident at an angle outside the specific angular range, by creating an index of refraction distribution, can provide the effects described above. Further, it is also possible to suitably combine the structures explained individually above to obtain the respective effects of those structures at the same time.

According to the present invention, as described above, a thin, light weight projector screen having good field of view angle characteristics, good brightness characteristics, and high contrast can be provided. The present invention is effective in improving the display quality for a projection system using the projector screen, and in addition, is also effective in making the projection system thinner and lighter in weight.

What is claimed is:

1. A screen that displays a projected optical image, comprising: a directional scattering layer that scatters incoming light within a specific incoming angle range and transmits incoming light outside the specific incoming angle range, wherein the directional scattering layer is a column-shaped lens sheet that functions to guide light in a thickness direction thereof and comprises a plurality of column structures arranged within a plane of the column-shaped lens sheet, the column structures each comprising a center region that extends continuously in the thickness direction of the lens sheet and that has a higher index of refraction than a peripheral region thereof around the center region.

2. A screen according to claim 1; wherein the directional scattering layer is divided into a plurality of regions having different specific incoming angle ranges.

3. A screen according to claim 2; wherein an optical axis direction of an optical image projected to each of the divided regions and the center of the specific angle range of the divided region are set to be symmetric with reference to a perpendicular on the screen.

4. A screen according to claim 2; wherein an optical axis direction of an optical image projected to each of the divided regions is set to substantially coincide with the center of the specific angle range of the divided region.

5. A screen according to claim 2; wherein the center lines of the specific angle ranges of the divided regions are set to substantially converge in a specific direction.

6. A screen according to claim 2; wherein the specific angle range of each of the divided regions is set to be symmetric with a viewing direction of an observer with reference to a perpendicular on the screen.

7. A screen according to claim 1; wherein the directional scattering layer includes a first directional scattering layer that scatters incoming light within a first specific incoming angle range and transmits incoming light outside the first specific incoming angle range, and a second directional scattering layer that scatters incoming light within a second specific incoming angle range and transmits incoming light outside the second specific incoming angle range, and wherein a direction of the center axis of the first specific angle range is different from a direction of the center axis of the second specific angle range.

8. A screen according to claim 1; further comprising an optical diffusing layer provided on a side of the directional scattering layer opposite to a direction toward which the optical image is projected.

9. A screen according to claim 1; further comprising an optical reflecting layer having a specific reflectance provided on a rear side of the directional scattering layer.

10. A screen according to claim 1; further comprising periodic absorption stripes formed
on a front surface of the directional scattering layer.

11. A screen according to claim 1; further comprising an optical diffusing layer provided on a viewing point side of the directional scattering layer.

12. A screen according to claim 1; wherein the column structures each comprise a graded index column-shaped lens having an index of refraction that becomes continuously larger toward the center of the lens.

13. A screen according to claim 1; wherein the column structures each comprise a step index column-shaped lens having a two-layer structure in which the index of refraction of a center portion is higher than the index of refraction of an outer peripheral portion center portion.

14. A screen that displays a projected optical image, comprising: a directional scattering layer that scatters incoming light within a specific incoming angle range and transmits incoming light outside the specific incoming angle range, wherein the directional scattering layer is a perforated transparent resin sheet having through holes formed in the thickness direction of the resin sheet.

15. A screen that displays a projected optical image, comprising: a directional scattering layer that scatters incoming light within a specific incoming angle range and transmits incoming light outside the specific incoming angle range, wherein the directional scattering layer is a column-shaped lens sheet that functions to guide light in the thickness direction thereof and comprises a plurality of column structures arranged within a plane of the column-shaped lens sheet, the column structures each comprising a region of liquid crystal polymer having liquid crystal molecules arranged therein and extending continuously in the thickness direction of the lens sheet.

16. A screen that displays a projected optical image, comprising: a directional scattering layer that scatters incoming light within a specific incoming angle range and transmits incoming light outside the specific incoming angle range, wherein the directional scattering layer is a sheet that functions to guide light in a thickness direction thereof and comprises a plurality of column-shaped lenses arranged within a plane of the sheet, the column-shaped lenses each comprising a center region that extends continuously in the thickness direction of the lens sheet and that has a higher index of refraction than a peripheral region thereof around the center region.

17. An image projector system comprising:

a screen having a directional scattering layer that and transmits incoming light outside the specific incoming scatters incoming light within a specific incoming angle range angle range, wherein the directional scattering layer is a column-shaped lens sheet that functions to guide light in the thickness direction thereof and comprises a plurality of column structures arranged within a plane of the column-shaped lens sheet, the column structures each comprising a center region that extends continuously in the thickness direction of the lens sheet and that has a higher index of refraction than a peripheral region thereof around the center region; and an optical image projector that projects an optical image onto the screen.

* * * * *